(12) United States Patent
Moulsley et al.

(10) Patent No.: US 6,708,037 B1
(45) Date of Patent: Mar. 16, 2004

(54) RADIO COMMUNICATION SYSTEM

(75) Inventors: Timothy J. Moulsley, Caterham (GB); Bernard Hunt, Red Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 407 days.

(21) Appl. No.: 09/631,358

(22) Filed: Aug. 2, 2000

(30) Foreign Application Priority Data

Aug. 6, 1999 (GB) ............................................. 9918495

(51) Int. Cl.$^7$ ................................................ H04Q 7/20
(52) U.S. Cl. .................... 455/452.1; 455/515; 370/335; 370/342
(58) Field of Search ................................. 455/464, 450, 455/452.1, 515; 370/329, 337, 347, 348, 349, 522, 335, 342

(56) References Cited

U.S. PATENT DOCUMENTS

| 5,673,259 A | * | 9/1997 | Quick, Jr. .................... 370/342 |
| 5,790,551 A | * | 8/1998 | Chan ........................... 370/458 |
| 5,894,472 A | * | 4/1999 | de Seze ....................... 370/337 |
| 6,038,223 A | * | 3/2000 | Hansson et al. ............ 370/329 |
| 6,381,229 B1 | * | 4/2002 | Narvinger et al. .......... 370/328 |

* cited by examiner

Primary Examiner—Marsha D. Banks-Harold
Assistant Examiner—J Moore
(74) Attorney, Agent, or Firm—Jack D. Slobod

(57) ABSTRACT

A radio communication system has a random access channel for the transmission of data (214) from a secondary station to a primary station. Such a channel is intended for use by secondary stations having data (214) to transmit to a primary station while not actually engaged in a call.

A secondary station requesting access chooses a signature corresponding to the resource it requires to encode an access preamble (202). It may be known, from a resource availability message (402) broadcast by the primary station, that certain resources are unavailable. In this case the primary and secondary stations dynamically re-assign signatures corresponding to the unavailable resources to available resources, thereby reducing the probability of collisions between different secondary stations requesting the same resource.

12 Claims, 3 Drawing Sheets

| E | Broadcast | | Dynamic | |
|---|---|---|---|---|
| | B | P | B | P |
| 1 | 60 | 1,2,3 | 60 | 1,2,3,10,13,16 |
| | 120 | 4,5,6 | 120 | 4,5,6,11,14 |
| | 240 | 7,8,9 | 240 | 7,8,9,12,15 |
| | 480 | 10,11,12 | | |
| | 960 | 13,14 | | |
| | 1920 | 15,16 | | |
| 2 | 60 | 1,2,3,4 | 60 | 1,2,3,4,13,16 |
| | 120 | 5,6,7,8 | 120 | 5,6,7,8,14 |
| | 240 | — | | |
| | 480 | 9,10,11,12 | 480 | 9,10,11,12,15 |
| | 960 | — | | |
| | 1920 | 13,14,15,16 | | |
| 3 | 60 | 1,2,3,4 | 60 | 1,2,3,4,5,8,16 |
| | 120 | 5,6,7,8 | | |
| | 240 | 9,10,11,12 | 240 | 9,10,11,12,6,13 |
| | 480 | 13,14 | | |
| | 960 | 15 | 960 | 15,7,14 |
| | 1920 | 16 | | |
| 4 | 60 | 1,2,3,4,5,6,7,8 | | |
| | 120 | — | | |
| | 240 | — | | |
| | 480 | 9,10,11,12,13,14,15,16 | 480 | 1,2,3,4,5,6,7,8,9,10, 11,12,13,14,15,16 |
| | 960 | — | | |
| | 1920 | — | | |
| 5 | 60 | 5,6,7,8 | 60 | 5,6,7,8,13,16 |
| | 120 | — | | |
| | 240 | 13,14 | | |
| | 480 | — | | |
| | 960 | 15 | 960 | 15,14 |
| | 1920 | 16 | | |

| S | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ | $P_{16}$ |
|---|---|---|---|---|---|---|---|---|---|---|---|---|---|---|---|---|
| 1 | A | A | A | -A | -A | -A | A | -A | -A | A | A | -A | A | -A | A | A |
| 2 | -A | A | -A | -A | A | A | -A | A | A | A | -A | A | -A | A | -A | A |
| 3 | A | -A | A | A | A | -A | A | A | -A | A | A | -A | A | -A | A |
| 4 | -A | A | -A | A | -A | -A | -A | -A | A | -A | A | -A | A | A | A |
| 5 | A | -A | -A | -A | -A | A | A | -A | A | -A | A | -A | A | -A | -A | A |
| 6 | -A | -A | A | -A | A | -A | A | -A | A | -A | A | A | A | A | A |
| 7 | -A | A | A | A | -A | -A | A | A | A | -A | -A | -A | -A | -A | A |
| 8 | A | A | -A | A | -A | -A | -A | -A | A | A | A | A | A | A | -A | A |
| 9 | A | -A | A | -A | -A | A | -A | A | A | A | -A | -A | -A | A | A | A |
| 10 | -A | A | A | -A | A | A | -A | A | -A | -A | A | A | -A | -A | A | A |
| 11 | A | A | A | A | A | A | -A | -A | A | -A | A | A | -A | A | -A | A |
| 12 | A | A | -A | A | A | A | A | A | -A | -A | -A | -A | A | A | A | A |
| 13 | A | -A | -A | A | A | -A | -A | A | -A | A | -A | -A | -A | A | A |
| 14 | -A | -A | -A | A | -A | A | A | A | A | A | A | A | -A | A | A |
| 15 | -A | -A | -A | A | -A | -A | A | A | -A | -A | A | -A | A | -A | A | A |
| 16 | -A | -A | A | A | -A | A | -A | -A | -A | A | -A | A | A | A | -A | A |

|   | Broadcast | | Dynamic | |
|---|---|---|---|---|
| E | B | P | B | P |
| 1 | 60 | 1,2,3 | 60 | 1,2,3,10,13,16 |
|   | 120 | 4,5,6 | 120 | 4,5,6,11,14 |
|   | 240 | 7,8,9 | 240 | 7,8,9,12,15 |
|   | 480 | 10,11,12 | | |
|   | 960 | 13,14 | | |
|   | 1920 | 15,16 | | |
| 2 | 60 | 1,2,3,4 | 60 | 1,2,3,4,13,16 |
|   | 120 | 5,6,7,8 | 120 | 5,6,7,8,14 |
|   | 240 | — | | |
|   | 480 | 9,10,11,12 | 480 | 9,10,11,12,15 |
|   | 960 | — | | |
|   | 1920 | 13,14,15,16 | | |
| 3 | 60 | 1,2,3,4 | 60 | 1,2,3,4,5,8,16 |
|   | 120 | 5,6,7,8 | | |
|   | 240 | 9,10,11,12 | 240 | 9,10,11,12,6,13 |
|   | 480 | 13,14 | | |
|   | 960 | 15 | 960 | 15,7,14 |
|   | 1920 | 16 | | |
| 4 | 60 | 1,2,3,4,5,6,7,8 | | |
|   | 120 | — | | |
|   | 240 | — | | |
|   | 480 | 9,10,11,12,13,14,15,16 | 480 | 1,2,3,4,5,6,7,8,9,10, 11,12,13,14,15,16 |
|   | 960 | — | | |
|   | 1920 | — | | |
| 5 | 60 | 5,6,7,8 | 60 | 5,6,7,8,13,16 |
|   | 120 | — | | |
|   | 240 | 13,14 | | |
|   | 480 | — | | |
|   | 960 | 15 | 960 | 15,14 |
|   | 1920 | 16 | | |

FIG. 5

RADIO COMMUNICATION SYSTEM

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access channel refers to the logical channel on which random access transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a such a scheme being developed for UMTS, there are a number of random access packet channels available to a MS. A request for access to a packet channel sent by the MS is encoded with a randomly-chosen signature, which corresponds to a packet channel resource. If a suitable channel is available for use, the BS allocates it to the requesting MS.

An object of the present invention is to provide a random access channel having improved resource utilisation.

According to a first aspect of the present invention there is provided a radio communication system having a random access channel for the transmission of data from a secondary station to a primary station, the primary station having means for responding to a request from the secondary station for access to a random access channel resource, the request comprising transmission of a signal encoded with a signature corresponding to the resource, wherein the primary station has means for periodically signalling the availability of random access channel resources to secondary stations and in that the primary and secondary stations have means for dynamically re allocating signatures assigned to unavailable resources to available resources.

According to a second aspect of the present invention there is provided a primary station for use in a radio communication system having a random access channel for the transmission of data from a secondary station to the primary station, the primary station having means for responding to a request from the secondary station for access to a random access channel resource, the request comprising transmission of a signal encoded with a signature corresponding to the resource, wherein means are provided for periodically signalling the availability of random access channel resources to secondary stations and for dynamically re-allocating signatures assigned to resources that are currently unavailable to resources that are available.

According to a third aspect of the present invention there is provided a secondary station for use in a radio communication system having a random access channel for the transmission of data to a primary station, the secondary station having means for requesting access to a random access channel resource by transmitting a signal encoded with a signature corresponding to the resource, wherein means are provided for determining the availability of random access channel resources from signals periodically transmitted by the primary station and for dynamically re-allocating signatures assigned to resources that are currently unavailable to resources that are available.

According to a fourth aspect of the present invention there is provided a method of operating a radio communication system having a random access channel for the transmission of data from a secondary station to a primary station, the method comprising the secondary station requesting access to a random access channel resource by transmitting a signal encoded with a signature corresponding to the resource and the primary station responding to the request, characterised by the primary station periodically signalling the availability of random access channel resources to secondary stations and by the primary and secondary stations dynamically re-allocating signatures assigned to resources that are currently unavailable to resources that are available.

Embodiments of the present invention will now be described, by way of example, with reference to the accompanying drawings, wherein:

FIG. 5 is a table illustrating a method in accordance with the present invention of dynamic re-assignment of access preamble signatures.

In the drawings the same reference numerals have been used to indicate corresponding features.

Figures 1, 3:
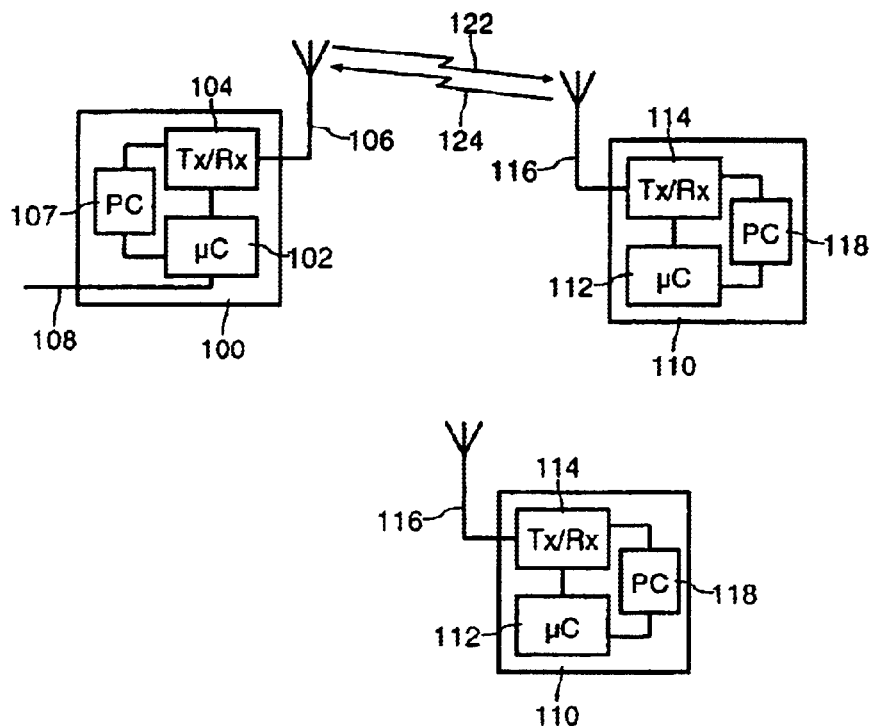
FIG. 1 is a block schematic diagram of a radio communication system.
FIG. 3 is a table showing one possible set of 16 preamble signatures.

Referring to FIG. 1, a radio communication system comprises a primary station (BS) 100 and a plurality of secondary stations (MS) 110. The 3o BS 100 comprises a microcontroller ($\mu$C) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
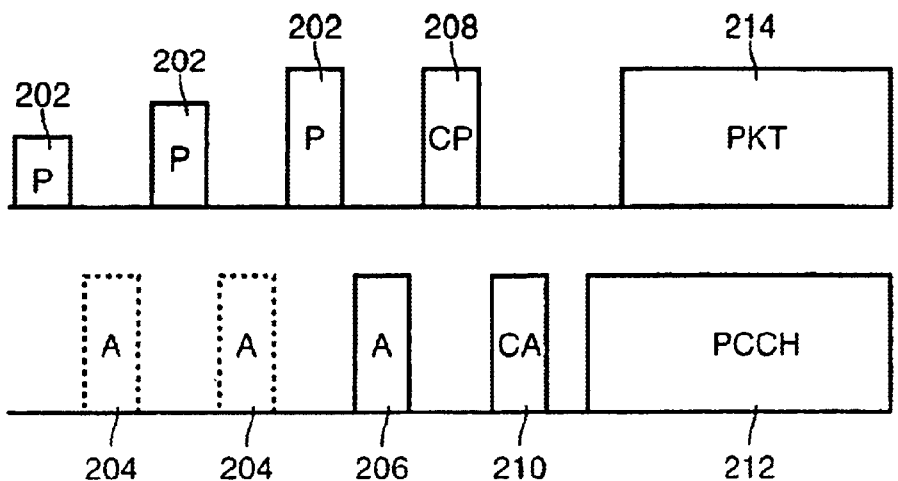
FIG. 2 illustrates a basic random access packet channel scheme.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature randomly chosen from a set of 16 possible signatures, at a low power level in a particular access slot.

A signature is a signal characterised by its scrambling code and channelisation code modulated by a specific bit sequence. A mutually orthogonal set of signatures can be obtained by defining a set of mutually orthogonal bit sequences for the modulation. One example of such a set is shown in FIG. 3, the set comprising 16 signatures $P_1$ to $P_{16}$.

Each signature $P_i$ comprises 16 complex symbols S, each of which is either A or –A, where A=1+j. The inverse of each signature is obtained by interchanging A and –A. The signatures and their inverses are all mutually orthogonal.

A different set of signatures can be obtained by changing the scrambling code or the channelisation code (i.e. the physical channel), or by using a different mutually orthogonal set of bit sequences. Alternatively a larger set of signatures may be defined in such a way as to have low cross correlations, rather than strict orthogonality. Although the present specification refers to sets of 16 signatures different implementations may use sets having different numbers of signatures.

In this basic scheme the choice of preamble signature for encoding the access preamble 202 determines the physical channel requested by the MS 110, with each preamble signature corresponding to a limited number of uplink and downlink channels. If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might typically be 1ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

As well as informing the MS 110 that its preamble 202 has been received, the acknowledgement 206 may be positive, to signal that the requested channels are free, or negative, to signal that they are in use and access is denied to the MS 110. A negative acknowledgement (NACK) may be indicated by the BS 100 inverting the phase of the signature (with respect to some reference or pilot signal). Alternatively, some of the signatures used by the BS 100 for acknowledgement may also be used as a NACK.

The BS 100 will only transmit one acknowledgement for each access slot, however many preambles 202 were transmitted. One basis for the selection could be to acknowledge the preamble 202 received with the highest power. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase may follow the transmission of an acknowledgement 206 which indicated that the requested channels were free. Each MS 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the selected preamble 208, for example that received with the highest power, which acknowledgement 210 enables the MS 110 to transmit its data. Hence, if more than one MS 110 selected the same access preamble 202 the chance of the same contention resolution preamble 208 also being selected is small.

After this contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

A problem with the basic scheme described above is that a MS 110 may be denied access to a packet channel corresponding to its selected preamble signature, even though other suitable channels may be available. This makes it likely that a MS 110 will spend significant time waiting for a channel to become available, particularly when traffic loading is high.

Figure 4:
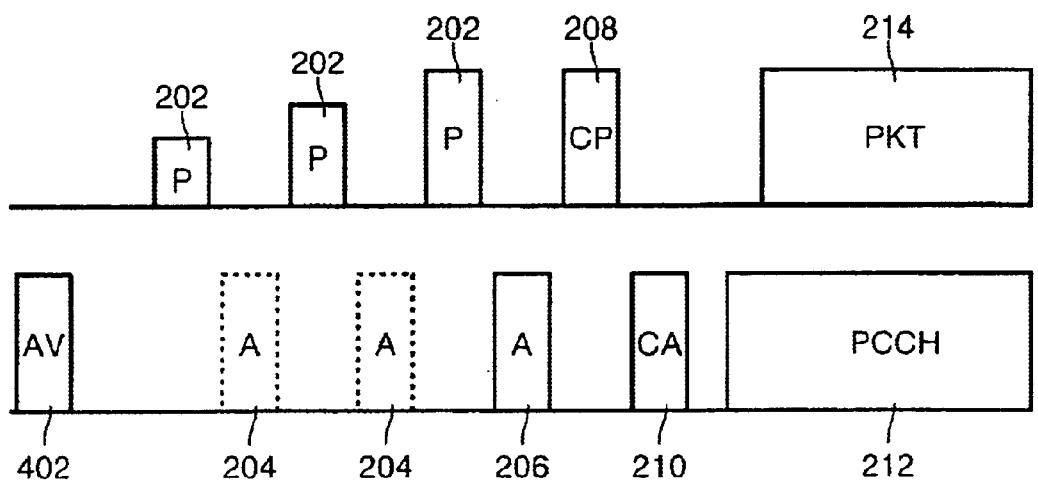
FIG. 4 illustrates an enhanced random access packet channel scheme having a packet channel availability message.

A solution to this problem is for the BS 100 to signal the availability of packet channel resources. One such scheme, disclosed in more detail in our co-pending UK patent application 9921548.5 (our reference PHB 34390), combined with the scheme of the present invention, is illustrated in FIG. 4. In this combined scheme the BS 100 repeatedly broadcasts a packet channel availability (AV) message 402, which informs a MS 110 about the resources currently available. Broadcasting the AV message 402 once per frame is a reasonable compromise between downlink overhead and delay, since the overall transmission delay will be dominated by the time taken to transmit the data packets 214, typically a few frames.

This and other similar schemes solve the problem that a MS 110 may be denied access to a packet channel resource corresponding to its selected access preamble signature, by enabling the MS 110 to select a signature corresponding to a resource known to be available. However, if not all of the possible packet channel resources are available there are signatures assigned for resources which cannot be used.

The basic information on the assignment of access preamble signatures to packet channel resources is broadcast by the BS 100 to all mobile stations 110 in its coverage area. In a system in accordance with the present invention, signatures which have been pre-assigned to resources which are not currently available (as signalled by the BS 100, for example via the AV message 402) are temporarily re-used for resources which are available. This re-assignment is done in a predetermined manner. Hence, no additional signalling is required since a MS 110 can determine the current mapping of access preamble signatures to resources from the resource availability information and the mapping of signatures to resources broadcast by the BS 100. In variations of this system the BS 100 may signal the method to be used by a MS 110 for signature reallocation or may signal modifications to the method.

One possible method for dynamic re-assignment of signatures is to assemble the unused signatures in a predetermined order (for example ascending numerical order) and assign them one at a time to available resources, starting with the lowest bit rate and working up. If there are more free signatures than available resources then the process wraps around.

Consider the example of the set of 16 access preamble signatures shown in FIG. 3. Five examples showing the application of a method in accordance with the present invention for dynamic re-assignment of the signatures are illustrated in the table of FIG. 5. Each example E is labelled from 1 to 5 in the first column of the table. The broadcast assignments of signatures P to bit rates B (in kbps) are shown in the second and third column, where the integer 1 identifies signature $P_1$ and so on. The dynamic assignments of signatures P to bit rates B are shown in the fourth and fifth columns.

In example 1, the broadcast assignment of signatures allocates two or three signatures to each bit rate in ascending numerical order. However, the AV message 402 indicates that the three highest bit rates (480, 960 and 1920 kbps) are not available, and hence the MS 110 can determine that signatures 10 to 16 are unused. The first of these unused signatures, 10, is therefore assigned to the lowest bit rate, 60 kbps, signature 11 to 120 kbps and signature 12 to 240 kbps. Then the process wraps around, assigning signature 13 to 60 kbps, signature 14 to 120 kbps and signature 15 to 240 kbps. Finally the process wraps around once more assigning signature 16 to 60 kbps, after which there are no more unused signatures and the process terminates.

The other examples shown in FIG. 5 are derived in a similar manner. Note that it is possible, as shown in example 5, that the BS 100 does not allocate all the available signatures (in this case signatures 1 to 4 and 9 to 12). Hence, although they are unused these signatures are not available for dynamic re-allocation.

It will be appreciated that there are a range of alternative methods for assigning unused (but available) signatures to resources, all falling within the scope of the present invention.

A system in accordance with the present invention has a number of advantages over known systems having a packet channel. By ensuring that all the available signatures are assigned to available resources, the probability of collision (when two mobile stations 110 wish to access the same resource and choose the same preamble signature) is reduced. This provides reduced delay for a MS 110 requesting a packet channel, and more efficient allocation of available resources.

The present method imposes no requirement for additional signalling since the re-assignments can be determined from broadcast information. Further, there is no requirement that a particular MS 110 implement the scheme described above, since there is no re-assignment of signatures allocated to bit rates which are available.

The principle behind the present invention is that signatures which are known to be (temporarily) unused, or unusable, can be dynamically re-assigned to other uses in a predetermined manner to reduce collision probabilities. This principle can be applied in other contexts. For example, our co-pending UK patent application 0000293.1 (our reference PHGB 000003) discloses a system in which the allocation of packet channels is signalled by the BS 100 in combination with a contention resolution acknowledgement 210. In such a system if it is known that certain channels are currently unavailable, via an AV message 402 or some alternative means, then signatures assigned to signalling allocation of these unavailable channels could be re-assigned, for example to contention resolution preambles 208.

In addition to the use of different signatures to differentiate between different resources, a system in accordance with the present invention may also allocate different time slots for access attempts relating to different resources. Further, although the available resources in the embodiments described above were packet channels having different data rates, other embodiments may have different resources available. An example is channels having different service classes, with one or more signatures allocated to each service class.

As well as its application in a FDD system as described above, the present invention could be applied in other types of communication system. For example, it could be used in a Time Division Multiple Access (TDMA) system provided that the uplink transmissions take place in different time slots to the downlink transmissions.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
    a primary station;
    a secondary station;
    a random access channel for the transmission of data from said secondary station to said primary station;
    wherein said primary station includes means for responding to a request from said secondary station for access to a random access channel resource, the request including a transmission of a signal encoded with a signature corresponding to the random access channel resource;
    wherein said primary station further includes means for periodically signaling an availability of random access channel resources to said secondary station; and
    wherein said primary station and said secondary station include means for dynamically reallocating signatures assigned to unavailable random access channel resources to available random access channel resources.

2. The system as claimed in claim 1, wherein said random access channel is adapted for transmission of data in packets.

3. A primary station for use in a radio communication system having a random access channel for the transmission of data from a secondary station to said primary station, said primary station comprising:
    means for responding to a request from the secondary station for access to a random access channel resource, the request including a transmission of a signal encoded with a signature corresponding to the random access channel resource; and means for periodically signaling an availability of random access channel resources to the secondary station; and means for dynamically re-allocating signatures assigned to random access channel resources that are currently unavailable to random access channel resources that are available.

4. The primary station as claimed in claim 3, further comprising:

means for informing the secondary station of which one of a plurality of methods is to be used for re-allocation of signatures.

5. A secondary station for use in a radio communication system having a random access channel for the transmission of data to a primary station, said secondary station comprising:

means for requesting access to a random access channel resource by transmitting a signal encoded with a signature corresponding to the random access channel resource;

means for determining an availability of random access channel resources from signals periodically transmitted by the primary station; and means for dynamically re-allocating signatures assigned to random access channel resources that are currently unavailable to random access channel resources that are available.

6. The secondary station as claimed in claim 5, further comprising:

means for determining which one of a plurality of methods is to be used for re-allocation of signatures from signals transmitted by the primary station.

7. A method of operating a radio communication system having a random access channel for the transmission of data from a secondary station to a primary station, the method comprising:

operating the primary station to periodically signal an availability of random access channel resources to the secondary station; and operating the primary station and the secondary station to dynamically re-allocate signatures assigned to random access channel resources that are currently unavailable to random access channel resources that are available.

8. The method as claimed in claim 7, wherein the to random access channel resources are channels having different data rates.

9. The method as claimed in claim 7, wherein the to random access channel resources are channels having different service classes.

10. The method as claimed in claim 7, further comprising:

operating the primary station and the secondary station to assign an order to signatures corresponding to unavailable random access channel resources and to allocate the signatures in this order to available random access channel resources in turn.

11. The method as claimed in claim 7, further comprising:

operating the primary station to inform the secondary station which one of a plurality of methods is to be used for re-allocation of signatures.

12. The method as claimed in claim 7, further comprising:

implementing a predetermined basic method for re-allocation of signatures; and operating the primary station to inform the secondary station of any modifications to the predetermined basic method.

* * * * *